United States Patent [19]
Nakata

[11] Patent Number: 5,233,701
[45] Date of Patent: Aug. 3, 1993

[54] SYSTEM FOR MANAGING INTERPROCESSOR COMMON MEMORY

[75] Inventor: Akihiko Nakata, Tokyo, Japan

[73] Assignee: NEC Corporation, Japan

[21] Appl. No.: 330,122

[22] Filed: Mar. 29, 1989

[30] Foreign Application Priority Data

Mar. 29, 1988 [JP] Japan .................... 63-73115

[51] Int. Cl.[5] .................... G11C 7/00; G06F 12/00; G06F 12/06
[52] U.S. Cl. .................... 395/425; 395/600; 364/DIG. 1; 364/245.5; 364/246; 364/960.1; 365/230.03
[58] Field of Search .................... 364/DIG. 1, DIG. 2, 364/246, 245.5, 245.7, 246.5, 960.1, 966.1; 395/425, 600, 400; 365/230.03, 230.04, 238.5

[56] References Cited

U.S. PATENT DOCUMENTS

| | | |
|---|---|---|
| 4,149,239 | 4/1979 | Jenkins et al. .................... 364/200 |
| 4,423,480 | 12/1983 | Bauer et al. .................... 364/200 |
| 4,435,762 | 3/1984 | Milligan et al. .................... 364/200 |
| 4,476,524 | 10/1984 | Brown et al. .................... 364/200 |
| 4,571,674 | 2/1986 | Hartung .................... 364/200 |
| 4,604,694 | 8/1986 | Hough .................... 364/200 |
| 4,783,730 | 11/1988 | Fischer .................... 364/DIG. 1 |
| 4,956,771 | 9/1990 | Neustaedter .................... 364/200 |

OTHER PUBLICATIONS

IBM-TDB vol. 28, No. 4; "Dynamic Storage Pool Manager" pp. 1684-1686—Sep. 1985.
IBM-TDB vol. 18 No. 7—"Main Storage Allocation Method" by T. Sawyer pp. 2321-2323—Dec. 1975.

*Primary Examiner*—Alyssa H. Bowler
*Attorney, Agent, or Firm*—Laff, Whitesel, Conte & Saret

[57] ABSTRACT

A system for managing an interprocessor common memory in a multiprocessor system includes a memory block pool and a management table. The memory block pool is obtained by chaining N memory blocks of segmented memory blocks in the common memory by using two Queue Control Blocks ("QCBs") respectively assigned to the processors in opposite directions. The management table is constituted by a common memory block total count N required to manage the memory block pool, a memory block count $b_{X(modN)}$ (where X is 1 or 2) fetched by each of the processors, and a memory block count $c_{X(modN)}$ (where X is 1 or 2) which can be fetched at once. Each processor has a semaphore function for realizing means for asynchronously fetching $e_Y$ memory blocks from a start of a QCB$_Y$ when it is determined by using data of the management table that a condition that at least one memory block is always present in the memory block pool is satisfied, and means for asynchronously returning memory blocks to the start of the QCB$_Y$.

1 Claim, 2 Drawing Sheets

SYSTEM FOR MANAGING INTERPROCESSOR COMMON MEMORY

BACKGROUND OF THE INVENTION

The present invention relates to a system for managing an interprocessor common memory in a multiprocessor system.

In a conventional multiprocessor system of this type, when two processors use a common memory arranged therebetween, in order to protect data which is present in the same address space of the common memory from the other processor, exclusive OR control of the common memory is performed by hardware, or an address space is divided into two spaces to allow the two processors to use these different address spaces.

The above-described conventional system for managing the interprocessor common memory, however, cannot effectively operate processors in the multiprocessor system for the following reasons: (1) in exclusive OR control by hardware, if one processor occupies the common memory, since the operation of the hardware is stopped and the other processor is set in a ready state until the occupied state is released, access to the common memory is temporarily serialized and a specific exclusive OR control circuit is required in hardware, and (2) in the division of the address space in units of processors, since the address space to be used by two processors is divided, the utilization efficiency of the common memory is degraded.

SUMMARY OF THE INVENTION

It is a principal object of the present invention to provide a system for managing an interprocessor common memory, which can realize simple hardware without using a specific memory exclusive OR control circuit.

It is another object of the present invention to provide a system for managing an interprocessor common memory, which can prevent degradation in performance of a system.

It is still another object of the present invention to provide a system for managing an interprocessor common memory, which allows each processor to fetch a plurality of chained memory blocks by a single memory block fetch action.

A system for managing an interprocessor common memory is a kind of semaphore system. According to this system, variable-length memory blocks constituting a finite set pool are chained and managed by a queue structure in opposite directions in a common memory shared by two processors (to be referred to as CPUs hereinafter) using QCBs (queue control blocks), and a management table for managing the state of use of the memory blocks of the finite set pool for each CPU is arranged in the common memory. The semaphore system includes means for monitoring the number of memory blocks of the memory block pool which are used by the CPUs until predetermined conditions are satisfied, and asynchronously fetching/returning common memory blocks from/to QCBs which are respectively managed by the CPUs.

FIG. 2 shows a structure comprising: the above-described management table including a memory block total count N, a memory block count $b_{X(modN)}$ (where X is 1 or 2) currently fetched by a given CPU, and a maximum count $c_{X(modN)}$ (where X is 1 or 2) which can be fetched by the CPU by a single memory block fetch action; and two queue control blocks $QCB_X$ (where X is 1 or 2). Each CPU comprises a means capable of asynchronously fetching $e_Y$ memory blocks from $QCB_X$ (where X is 1 or 2) and a means for asynchronously returning the memory blocks to $QCB_X$ while conditions whether one or more memory blocks are present are satisfied, i.e., $N - (b_X + c_X) - (b_Y + e_Y) \geq 1$ (where $e_Y$ is a fetch request memory block count of condition $c_Y \geq e_Y$) and $b \equiv c \equiv e_{(modN)}$ are satisfied.

DETAILED DESCRIPTION OF THE PREFERRED EMBODIMENT

The present invention will be described below with reference to the accompanying drawings.

Figure 1:
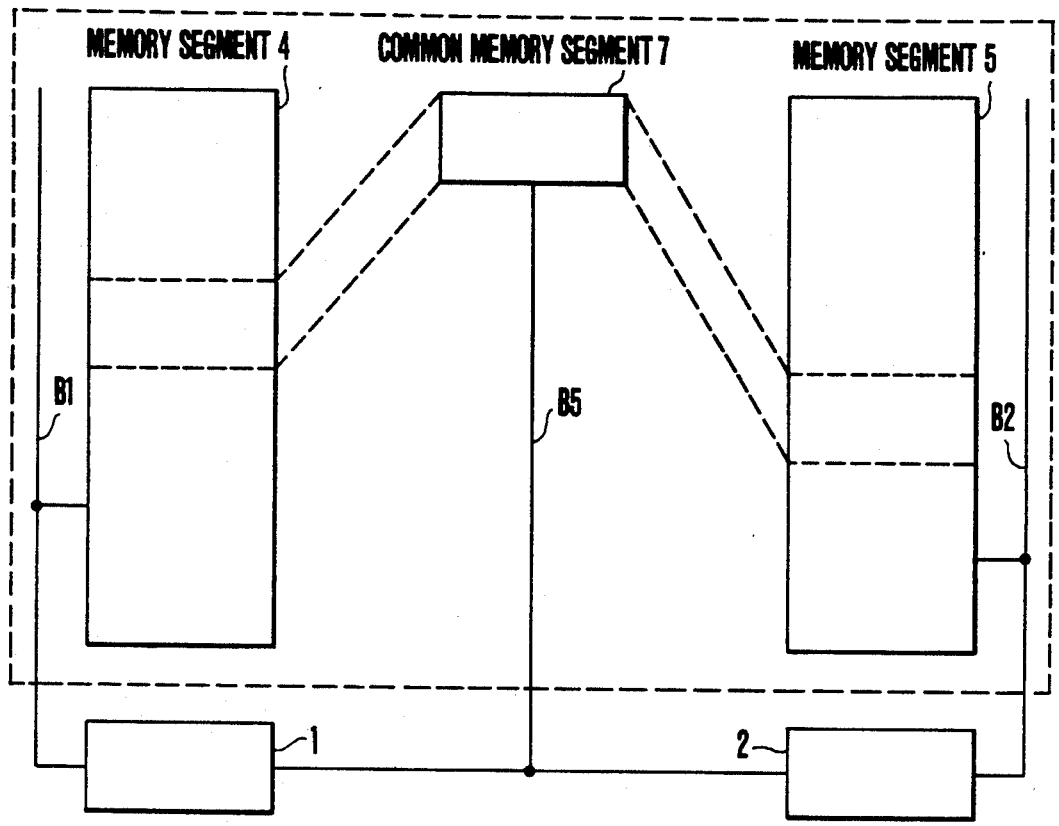
FIG. 1 is a view showing an arrangement of a multiprocessor system to which the present invention is applied.

FIG. 1 shows an arrangement of a multiprocessor system to which the present invention is applied. Processors 1 and 2 are respectively connected through independent local buses B1 and B2 to memory segments 4 and 5 which cannot be accessed from each other. The CPUs 1 and 2 are connected through a bus B5 to a common memory segment 7 shared by the CPUs 1 and 2. The length of the common memory segment 7 is not variable, but address spaces of CPUs are independently laid out in the segment 7. The common memory segment 7 can be asynchronously accessed from the CPUs 1 and 2.

Figure 2:
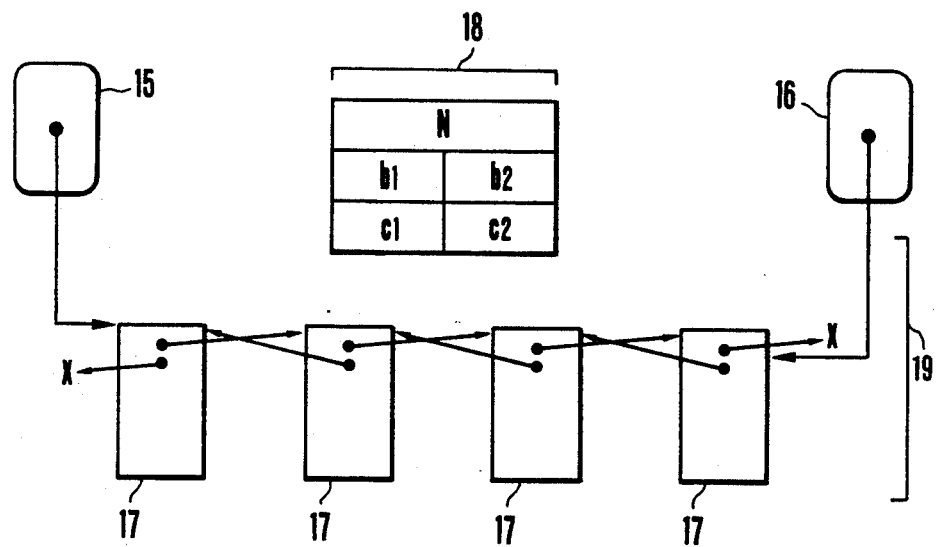
FIG. 2 is a view showing a relationship between a common memory management table, a memory block pool, and QCBs used in a system of the present invention.

FIG. 2 shows a relationship between a common memory management table, a memory block pool, and QCBs (queue control blocks) used in a system of the present invention. These data are present in the common memory segment 7 described with reference to FIG. 1, and are arranged to be shared by the CPUs 1 and 2.

A common memory management table 18 is constituted by a total count N of memory blocks which are present in the common memory segment 7, counts $b_1$ and $b_2$ of memory blocks current fetched by the CPUs 1 and 2, respectively, and maximum memory block fetch counts $c_1$ and $c_2$ which can fetched by the CPUs 1 and 2, respectively, by a single operation. These data are used by a means, arranged in each of the CPUs 1 and 2, for accessing or releasing the common memory block of the common memory segment 7, so as to determine whether conditions for accessing/releasing the common memory segment 7 are satisfied, and at the same time used for correction value retention of $b_X$ and $c_X$ (where X is 1 or 2).

A memory block pool 19 is a memory space for the memory segment 7 excepting the areas of the memory management table 18 and QCBs 15 and 16. This memory block pool 19 is a set of variable-length memory blocks 17. Each memory block 17 of the memory block pool 19 sents queues to the QCBs 15 and 16 as shown in FIG. 2, and is managed by the QCBs 15 and 16. A queue structure of LI (last-in)/FO (fast-out) is employed, and access can be made from each QCB. Each memory block 17 includes two sets of data. The start pointer of a next memory block chained from the QCB assigned to one CPU is stored as one of the set of data, and the start pointer of a next memory block chained from the QCB assigned to the other CPU is stored as the other data. The last memory blocks of memory blocks chained in the opposite directions are used as stoppers by setting the respective pointer values at 0 because no next memory block is present.

Figure 3:
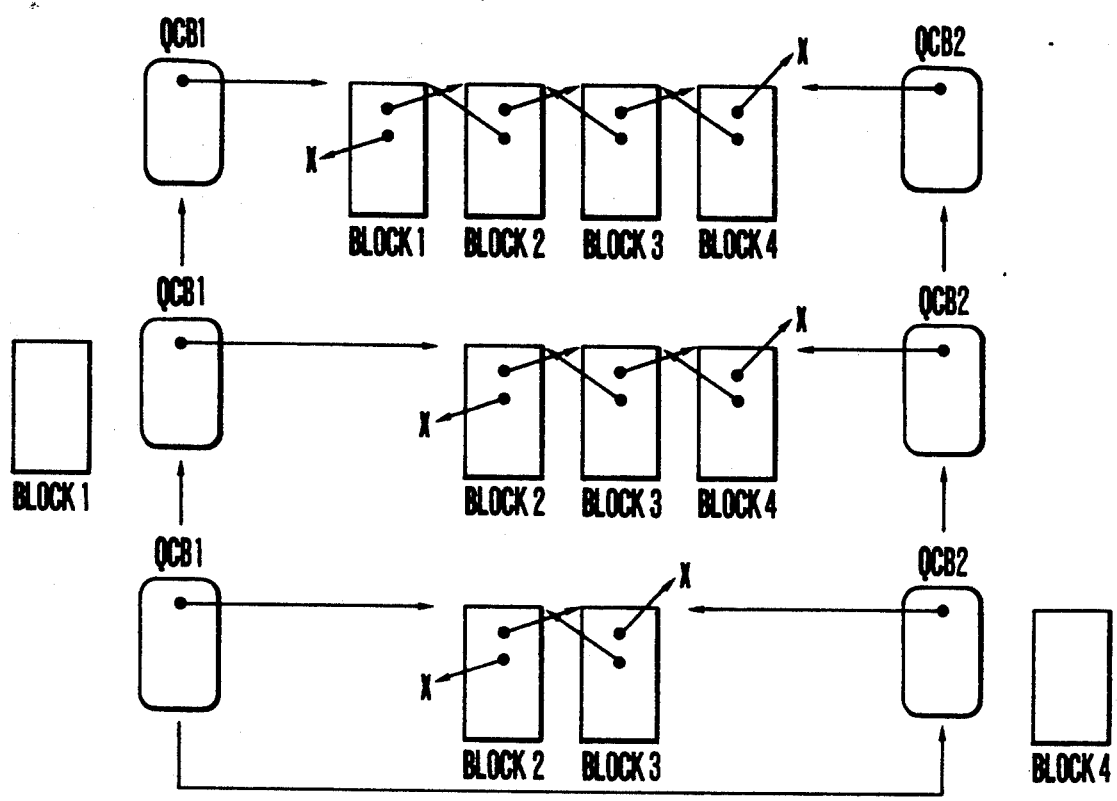
FIG. 3 is a view showing a transfer operation of management of a common memory between CPUs.
Figure 4:
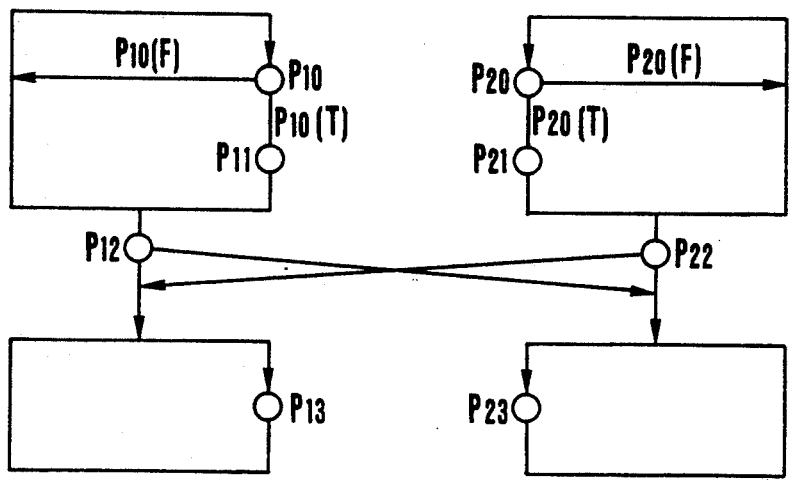
FIG. 4 is a flow chart for explaining an operation of the present invention.

An embodiment of the present invention will be described below with reference to FIGS. 2, 3, and 4.

Prior to a description on the overall system, the contents of P representing a process in each step will be described below:

$P_{10}$: checking a condition of $n-(b_1+d_1)-(b_2+c_2) \geq 1$ $(d_1 \leq c_1)$
where $d_1$ is a memory block count required by the CPU 1

$P_{11}$: fetching $d_1$ memory blocks from the QCB$_1$, and setting $b_1 = b_1 + d_1$ $(d_1 \leq c_1)$ $P_{12}$: use of fetched memory blocks by an application program $P_{13}$: returning used memory blocks, sending $e_1$ queues to the QCB$_1$, and setting $b_1 = b_1 - e_1$
where $e_1$ is the number of memory blocks to be returned $P_{20}$: checking a condition of $N-(b_1+c_1)-(b_2+d_2) \geq 1$ $(d_2 \leq c_2)$ $P_{21}$: fetching $d_2$ memory blocks from the QCB$_2$ and setting $b_2 = b_2 + d_2$ $(d_2 \leq c_2)$
where $d_2$ is a memory block count required by the CPU 2

$P_{22}$: use of fetched memory blocks by an application program $P_{23}$: returning used memory blocks, sending $e_2$ queues to QCB$_2$, and setting $b_2 = b_2 - e_2$
where $e_2$ is the number of memory blocks to be returned $P_{XY}$: processing x=CPU 1 or CPU 2 y=process(x)
(F): a result (false) of $P_{XY}$
(T): a result (true) of $P_{XY}$ $d_X$: a memory block count required to be fetched by the CPU 1 or CPU 2 $(d_X \leq c_X)$ $e_X$: a memory block count required to be returned by the CPU 1 or CPU 2

A fundamental principle of this flow of processing will be described below.

The common table management table 18 is generated by initial processing of the system, and the memory block pool 19 is generated by chaining the memory blocks 17 to the QCB$_X$ (where X is 1 or 2) 15 or 16.

When the initial processing is completed, each CPU can independently access the common memory block 17. However, only when conditions associated with memory block fetch, i.e., $N-(b_X+c_X)-(b_Y+e_Y) \geq 1$ (where X, Y=1 or 2; and $e_Y$: a fetch request memory block count of condition $c_Y \geq e_Y$) and $b \equiv c \equiv e_{(modN)}$ are satisfied, $e_Y$ memory blocks are fetched/extracted from memory blocks chained to the start of QCB$_Y$ (where Y is 1 or 2), and the common memory management table 18 is updated as $b_Y = b_Y + e_Y$. If the conditions are not satisfied, a free memory block will be waited for until the conditions are satisfied while other processing is performed.

After the fetched memory blocks are used, they are returned to the memory block pool 19 in the following method. Queues corresponding to the number $f_Y$ of memory blocks to be returned are sent to the start of QCB$_Y$, and the common memory management table 18 is updated as $b_Y = b_Y - f_Y f(modN)$.

In this case, completion of a return operation is acknowledged between the CPUs by interruption.

In addition, variables in the present invention satisfy the following condition:

$$b \equiv c \equiv e \equiv f_{(modN)}$$

An operation of the system shown in FIG. 1 will be described in detail below.

The common memory management table 18 is generated by one CPU in initial processing of the system. The memory blocks 17 are extracted from the common memory segment 7, and queues are sent to the QCB$_X$ (where X is 1 or 2) assigned to each of the processors 1 and 2, thereby generating the above-described memory block pool 19. The respective values in the common memory management table 18 are set in accordance with predetermined values.

Upon the above-described processing, a condition for using each CPU is set. Thereafter, when the other CPU is started, the two CPUs are equally set in an operative state.

When the initial processing is completed, an application program in each CPU can freely use memory blocks in the common memory segment 7 by a common memory fetch operation constituting part of a system routine to be provided and by a return access routine.

A process $P_1$ for fetching $d_1$ common memory blocks 17 by using an application program in one processor (which is the CPU 1 or CPU 2, and is denoted by $P_1$ in this case) will be described below.

When a fetch request of the common memory block 17 of the common memory segment 7 is sent from the application program to a system routine, determination whether the common memory block 17 can be fetched is performed in the process $P_{10}$ of a common memory fetch access routine by using data of the common memory management table 18. This determination method is performed by checking whether $N-(b_1+d_1)-(b_2+c_2) \geq 1$ is satisfied. If the above condition is not satisfied, the process $P_{10}(F)$ is performed, and the common memory segment 7 signals the application program that the common memory block 17 cannot be fetched, thus completing the process. If the condition is satisfied, the common memory block 17 can be fetched, and the flow of processing advances to the process $P_{10}(T)$. As a result, the value of $b_1$ in the common memory management table 18 is updated to $b_1+d_1$. That is, $b_1=b_1+d_1$ $(d_1<c_1; d_1$ is a memory block count) is set. Upon this updating, if the other CPU (P$_2$) performs the same processing described above, the common memory block count is guaranteed. In the above-described process $P_{11}$, common memory blocks represented by a designation count $(d_1)$ of that common memory blocks 17 queued to the start of the QCB$_1$ are extracted. The extraction processing is performed such that the start address of the next common memory block 17 stored in the QCB$_1$ (e.g., 15) is held in a register (not shown) of the processor $P_1$, and the value of the next pointer of the common memory blocks corresponding to the designation count $(d_1)$ is written in a common memory block start address field in the QCB$_1$ 15, thus completing the fetch processing. Subsequently, the fetch access routine is completed by returning the start address of the common memory blocks held in the register of processor $P_1$ to the application program. Since the application program obtains the start address of the $d_1$ common memory blocks, it can freely use these common memory blocks.

A return access routine for returning memory blocks used to a common memory pool will be described below.

When the application program accesses the return routine by using the pointer of $e_1$ (one in this case) memory blocks to be returned as input data, the memory blocks used are returned. The $e_1$ memory blocks must be chained prior to access by the application program.

In the return access routine, the process $P_{13}$ is performed, and process end data is returned to the application program, thereby completing the process. More specifically, in the process $P_{13}$, the $e_1$ memory blocks are queued to the start of the $QCB_1$ 15, and a chain from a $QCB_2$ is corrected. When queuing of the $e_1$ memory blocks is completed, the value $b_1$ in the common memory management table 18 is corrected to be $b_1=b_1-e_1$. In the above-described manner, fetch and return of memory blocks to and from the processor $P_1$ are performed. This process can be equally applied to the processors $P_2$. Referring to FIG. 4, $P_{10}$ corresponds to $P_{20}$, and $P_{11}$, $P_{12}$, and $P_{13}$ respectively correspond to $P_{21}$, $P_{22}$, and $P_{23}$, thus performing processing in the same manner as described above. Therefore, a detailed description thereof will be omitted. Note that FIG. 3 shows a principle of queue management of fetch and return of memory blocks.

As has been described above, according to the present invention, a semaphore system is realized by dividing a single common memory block management table and a single common memory into N units, and utilizing a memory block pool obtained by chaining segmented memory blocks using different QCBs in the opposite directions. Therefore, the following advantages can be obtained: (1) since no specific memory exclusive OR control circuit is required for hardware, the hardware can be simplified, (2) since no portion for performing synchronous or exclusive OR control is present in hardware, degradation in system performance can be prevented, and (3) a plurality of chained memory blocks can be fetched by a single memory block fetch action by using a queue structure.

What is claimed is:

1. A control system for managing a common interprocessor memory which is to be used in a multiprocessor system wherein said common memory is shared by at least two processors, said control system comprising:

two queue control blocks ("QCB"s);

a memory block pool obtained by chaining N memory blocks of segmented memory blocks to form said common memory by using said two queue control blocks respectively assigned to said processors, said chaining being in opposite directions; and a management table constituted by a common memory block having a total count N for managing said memory block pool, a memory block count $b_{X(modN)}$ (where X is 1 or 2); said block count being fetched by each of said processors, and a memory block count $C_{X(modN)}$ (where X is 1 or 2) which can be fetched at once, wherein each of said processors having a semaphore function for realizing means responding to data in said management table for asynchronously fetching $e_Y$ memory blocks from a start of a $QCB_Y$, said data indicating a condition wherein at least one memory block is always present in said memory block pool; and means for asynchronously returning said memory blocks to the start of said $QCB_Y$.

* * * * *